United States Patent
Farwig

[19]

[11] Patent Number: 6,145,984
[45] Date of Patent: Nov. 14, 2000

[54] COLOR-ENHANCING POLARIZED LENS

[75] Inventor: Michael J. Farwig, Lahaina, Hi.

[73] Assignee: Maui Jim, Inc., Peoria, Ill.

[21] Appl. No.: 09/218,886

[22] Filed: Dec. 22, 1998

Related U.S. Application Data

[60] Provisional application No. 60/068,697, Dec. 23, 1997.

[51] Int. Cl.[7] .................................................... G02C 7/12
[52] U.S. Cl. ................. 351/49; 351/44; 351/163
[58] Field of Search ................... 351/44, 49, 163,
351/165; 359/483, 485, 502, 885; 264/1.31, 1.32, 1.7

[56] References Cited

U.S. PATENT DOCUMENTS

| | | | |
|---|---|---|---|
| 3,617,114 | 11/1971 | Rogers | 351/49 |
| 3,649,696 | 3/1972 | Kazan, Jr. | 260/591 |
| 4,160,584 | 7/1979 | Giles | 351/49 |
| 4,311,368 | 1/1982 | Saito et al. | 351/165 |
| 4,320,940 | 3/1982 | Mueller et al. | 351/44 |
| 4,521,524 | 6/1985 | Yamashita | 501/64 |
| 4,838,673 | 6/1989 | Richards et al. | 351/44 |
| 5,061,659 | 10/1991 | Ciolek et al. | 501/64 |
| 5,149,183 | 9/1992 | Perrott et al. | 359/885 |
| 5,177,509 | 1/1993 | Johansen et al. | 351/49 |
| 5,245,470 | 9/1993 | Keum | 359/485 |
| 5,327,180 | 7/1994 | Hester, III et al. | 351/165 |

FOREIGN PATENT DOCUMENTS

| | | |
|---|---|---|
| 242 108 A1 | 1/1987 | Germany. |
| 54-133149 | 10/1979 | Japan. |
| 59-55403 | 3/1984 | Japan. |
| 62-55621 | 3/1987 | Japan. |
| 483697 | 5/1938 | United Kingdom. |

OTHER PUBLICATIONS

W.W. Coblentz, et al., "Spectral Transmissive Properties and use of Colored Eye–Protective Glasses", Circular of the National Bureau of Standards C421, U.S. Department of Commerce, Jun. 1, 1938.

*Primary Examiner*—Huy Mai
*Attorney, Agent, or Firm*—McDonnell Boehnen Hulbert & Berghoff

[57] ABSTRACT

A color-enhancing polarized lens is constructed having substantially trichroic spectral-transmission. A lens so constructed may have an overall transmitted tint which is a virtually colorless gray to the eye. A lens so constructed and tint-neutralized delivers unexpectedly dramatic improvements in the areas of color saturation, chromatic and luminous contrast, clarity of detail, depth perception, haze penetration, and overall impact.

16 Claims, 1 Drawing Sheet

COLOR-ENHANCING POLARIZED LENS

CROSS-REFERENCE TO RELATED APPLICATION

The priority benefit under 35 U.S.C. § 119(e) of provisional patent application Ser. No. 60/068,697 filed Dec. 23, 1997, is claimed.

BACKGROUND OF THE INVENTION

1. Field of the Invention

The invention relates to the sciences of optics and human color perception in general and to the field of sunglass lenses in particular. More specifically, the invention relates to the application of optical polarization, trichroic spectral-filter technology, and the principles of human color perception, to produce sunglass lenses of unprecedented vision-enhancing capability.

2. Description of Related Technology

The principal benefit of wearing sunglasses is obvious. They provide comfort and protection for the eyes by attenuating excessively bright light. Virtually all modern sunglasses further protect the eyes by filtering out harmful but invisible ultraviolet light. Some of these also provide increased eye comfort by blocking infrared light, which can aggravate "dry-eye" and cause ocular discomfort—particularly among contact-lens wearers. Neutral-gray remains the most popular tint, with 10 to 20 percent luminous transmission being most common.

Some sunglasses operate on the principle of aggressively blocking certain portions of the visible spectrum: an example of these are the blue-blocking amber types. These feature high transmission of yellow, orange, and red, diminished transmission of green and blue-green, and virtually no transmission of blue and violet. Color values are highly distorted by lenses of this type, and despite acceptance of amber to enhance contrast, loss of chromatic contrast results as their deep yellow-orange tint weakens color differentiation.

Prior art amber lenses are often claimed to increase visual acuity by limiting transmission to the red half of the spectrum, thus reducing chromatic aberration inherent in human vision. By blocking short visible wavelengths—roughly those below 500 nm—which scatter readily in the atmosphere and are more difficult for the human eye to focus, the deeper shades of amber tints are said to increase the visibility of distant objects or those obscured by fog or haze. The prior art advocates blocking blue spectra (380–500 nm) while promoting yellow spectra (570–600 nm) to maximize visual acuity, especially in hazy or foggy conditions.

Polarized glasses reduce glare by blocking light which has become polarized by being reflected off various surfaces. This is accomplished by means well known to the art. Polarized light reflected off horizontal surfaces—and to a lesser degree, diagonal surfaces—can be blocked by polarized sunglasses. This improves visibility of the surface itself, and in the case of water and other transparent media, increased visibility beneath the surface. By removing blinding reflected glare, and the need to squint when facing it, polarized lenses also provide increased eye safety and comfort for the wearer.

In the past, the benefits of polarization as applied to sunglasses have been well known and exploited. Indeed there are many existing commercial examples of polarized sunglasses. These have been available in both plastic and glass lens constructions for decades. And while the neutral-tint polarized sunglasses of prior art can remove reflected glare quite effectively—thereby revealing previously-hidden color—they produce no further enhancements to color saturation or contrast beyond this "unveiling" effect.

Various colored polarized sunglass lenses are also available; these suffer from the same shortcomings and compromises found in all colored sunglass lenses of prior art—they all favor some colors at the expense of others. Sunglass lenses of prior art, polarized or not, which were intended to enhance vision by means of non-neutral (i.e., colored) tint exhibit intrinsic chromatic inaccuracy. Amber lenses weaken blue, rose lenses weaken green, green lenses weaken red, and so on. Ordinary gray lenses often weaken colors and contrast.

Each tint has particular advantages in particular circumstances but none has all. Tint selection has been determined in the past by user preference, and with regard to particular landscapes, seasons, and subjects viewed. The prior art has failed to combine into a single pair of sunglasses all the desirable characteristics and none of the unwanted compromises of the many known lens types and tints. In the sunglass industry a long-standing and unfulfilled need has existed for a lens which simultaneously provides: a) excellent glare reduction, b) enhanced color saturation, chromatic contrast, luminous contrast, and acuity, c) apparently neutral tint; d) high color fidelity; e) improved visibility or colored objects partially obscured by fog or haze; and f) complete UV protection. It would be desirable to provide all of these qualities simultaneously and, highly preferably, without compromise.

SUMMARY OF THE INVENTION

Accordingly, the invention provides the sunglass user with improved perceptions of color saturation and optical contrast without requiring any apparent coloration (except gray) in the transmitted tint, promoting a sense of heightened accuracy and differentiation in viewed colors while providing full protection from UV and shortwave-blue spectra. Further, the lenses of the invention provide increased visual acuity, and maximize the visibility of objects partially obscured by fog or atmospheric haze.

A polarized sunglass lens having certain trichroic spectral-transmission properties as defined herein achieves one or more of these objects. The term "trichroic" denotes tricolor transmission—i.e., favoring the transmission of three distinct colors—in this case, the primary additive colors red, green, and blue. When viewing colorful subjects under clear bright sunlight, there is an unexpected and profound synergism in the lens of the present invention. The polarizer increases the color-enhancing effects of trichroic transmission. It is believed that the polarizer, through its revealing of color previously-hidden by reflected glare, uniquely cooperates with the trichroic contrast enhance to provide increased effectiveness.

The lens of one embodiment of the invention includes two lens elements, at least one element having trichroic properties as defined herein, laminated together with a polarizing film enclosed within. Alternative embodiments may incorporate polarized plastic lenses dyed, coated, or otherwise treated to have the said trichroic properties.

Other forms of the invention may include single-element trichroic lenses having a polarizing coating or surface treatment. Moreover, lenses of self-polarized synthetically-grown crystal similar to natural iolite or cordierite may have dopants added/or surface coatings applied to achieve trichroic properties. Many embodiments are possible; it is intended that the scope of the present invention include all implicit variations and functional equivalents as well as those examples herein stated.

DETAILED DESCRIPTION OF THE INVENTION

Figure 1:
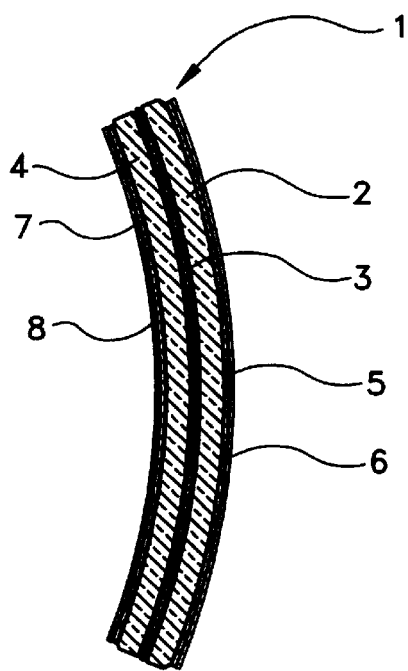
FIG. 1 is a cross-sectional view of a lens of the invention, depicting a polarizing film disposed between two curved lens elements, wherein the front lens element is photochromic, the rear lens element is a trichroic contrast enhancer, and coatings are applied to the convex surface of the front lens element and to the concave surface of the rear lens element.

It has been found that polarized sunglass lenses having trichroic properties as defined herein can provide unexpectedly significant enhancements to human vision with respect to color saturation, chromatic and luminous contrast, clarity of detail, depth perception, haze penetration, and overall visual impact.

As used herein, "photochromic" is defined as having the property of darkening (minimizing light transmittance) when exposed to sunlight, and lightening (maximizing light transmittance) when not exposed to sunlight.

As used herein, "trichroic contrast enhancer" shall be defined as any spectral filter which a) provides maximum transmission with respect to CIE (Commission Internationale De L'Eclairage) illuminant C at three or more points (hereinafter "maxima"), at least one of said maxima being located within each of three maximum-transmission wavelength bands, one each of said maximum-transmission wavelength bands being within the spectral ranges of 610–650 nm, 480–520 nm, or 420–460 nm (red, green, and blue respectively), each of said maxima having a value at least 125% of the integrated visible-light transmission of the spectral filter means;

b) provides minimum transmission with respect to CE illuminant C at two or more points (hereinafter "minima"), at least one of said minima being located within each of two minimum-transmission wavelength bands, within the spectra located chromatically between the maximum-transmission bands;

c) wherein the value of the highest of the maxima in each of the aforesaid maximum-transmission bands is equal to 80% to 120% of the average value of the three highest of the said maxima; and d) wherein the lowest value of the minima in each of the minimum-transmission bands is no greater than 75% of the value of the integrated visible-light transmission of the spectral filter means.

The trichroic property referred to herein is not to be confused with the trichroic category of naturally-polarized pleochroic crystals found in nature, such as iolite, cordierite, and the like. The trichroism of these crystals is directional in nature, as it is related to the planes of polarization intrinsic to the crystal, and thus the crystal will be seen to change color as it is rotated. The intrinsic polarizing property of this category of crystals was exploited by Rogers (U.S. Pat. No. 3,617,114). The trichroism utilized in the invention is not of the nature of Rogers, although the polarizing means of the present invention could be extended to include such crystals for their polarizing properties, when used in conjunction with a trichroic contrast enhancer of the invention. This usage could involve growing the crystal synthetically, adding dopants to substantially achieve the non-directional trichroic spectral transmission of the invention.

The invention is distinguishable from the prior art at least by advocating a lens which appears to be neutral-gray, but which enhances color and contrast. The invention is distinguishable from the existing notion of blocking all blue spectra to heighten visual acuity, advocating instead the balanced attenuation of blue wavelengths and of blue's complement, amber-yellow. Instead of relying on the simple broadband-tint technology of the prior art, the invention uses complex narrowband filtering. The invention exploits previously unknown levels of vision-enhancement, realized only when polarization is combined with balanced RGB trichroism.

It is intended that all polarized lenses incorporating material or treatments having trichroic properties as defined herein be considered to be within the scope of the invention.

For the purposes of the invention, any finished lens, lens element, lens layer, lens construction, or treatment thereof meeting the above criteria is considered to be "trichroic"; that is, providing maximum visible-light transmission in three discrete spectral bands, with attenuated spectral bands therebetween, as defined above. An example of an ophthalmic mineral glass meeting all of the above criteria is product code S-8807, from Schott Glass Technologies Incorporated of Duryea, Pa.

Schott S-8807 glass exhibits the characteristic chameleon-like property of all true trichroics; it has a peculiar amethyst tint which, in the case of Schott S-8807 glass, appears blue-violet in sunlight, rose in incandescent light, and green in fluorescent light. Trichroic lens material of a tint other than amethyst could be used in the invention, such as Schott S-8801 glass, which is bluish in daylight. Trichroic material of any color could be used as long as the overall transmitted tint of the finished lens can be made satisfactory through the incorporation of additional tint.

Trichroic lens material of neutral-gray tint would be especially desirable for the sake of simplicity. Trichroic neutral-gray glass has been reduced to practice and at the time of this writing is being incorporated into finished lenses for evaluation. The experimental glass, Schott S-8506 glass, is formed of a lanthanide base composition doped with oxides of neodymium (Nd), praseodymium (Pr), and erbium (Er). The dopant ratio chosen produces a glass which is neutral gray in tint, has a luminous transmission of approximately 61% at 1 mm thickness, and complies with spectral transmission requirements of the European Committee for Standardization (CEN) Standard EN 1836 of January 1997. The dopant ratio consists of 1.512 mole percent $Nd_2O_3$, 1.657 mole percent $Pr_2O_3$, and 1.243 mole percent $Er_2O_3$, in the same lanthanide base as Schott S-8807 glass but without the oxides of copper and cerium which are present in Schott S-8807 glass.

As used herein, the phrase "lens elements" includes but is not limited to lenses formed of ground and polished mineral glass, crystal, or optical-grade plastic; molded and/or extruded plastic lenses; and flat plastic which is cut and formed into lenses of a desired shape.

In a preferred embodiment of the invention, there is provided a laminated, light-polarizing lens constructed with a front lens element and a rear lens element, each lens element has a convex surface on one side and a concave surface on the other side, wherein the front lens element is photochromic, and the rear lens element is a trichroic contrast enhancer, wherein the lens elements are adhered together with a polarizing film disposed between the lens elements, the convex surface of the front lens element has a semi-transparent mirror coating with a hydrophobic overcoating, and the concave surface of the rear lens element has an antireflectant coating with a hydrophobic overcoating.

In another embodiment of the invention, there is provided a laminated light-polarizing lens constructed with a front lens element and a rear lens element, each lens element has a convex surface on one side and a concave surface on the other side, the front lens element being photochromic and the rear lens element being a trichroic contrast enhancer, wherein the lens elements are adhered together with a polarizing film sandwiched between the lens elements, the convex surface of the front lens element having a hydrophobic coating, the concave surface of the front lens element having a semi-transparent mirror coating, and the concave surface of the rear lens element having an antireflectant coating with a hydrophobic overcoating.

In another embodiment of the invention, there is provided a single lens body which has a convex surface on one side and concave surface on the other side, wherein the lens body is a trichroic contrast enhancer with a polarizing coating or treatment applied to at least one of its surfaces, and the lens body has an antireflectant coating with a hydrophobic overcoating applied to its concave surface.

Referring to FIG. 1, a preferred embodiment of the invention is depicted as composite lens body generally designated 1 having a front lens element 2 and a rear lens element 4, conjoined with and enclosing a polarizing film 3, the front lens element being a brown photochromic, the rear lens element being a trichroic contrast enhancer, and the polarizing film being gray. The exact tints of the front lens element and polarizing film, as well as any treatments or coatings thereupon or therein can be chosen to provide an apparently neutral transmitted tint.

For example, when using a 1 mm thick rear lens element of Schott S-8807 glass, the pale purplish color of the glass (under CIE standard illuminant C) can be rendered undetectable to the wearer by using a common variety of slightly-bluish gray polarizer having about 25% transmission, a 1 mm thick brown photochromic front lens element of Photobrown TD from Corning Class in Corning, N.Y., coated with semi-transparent blue-lavender dielectric mirror coating available as process 18S from North American Coating Laboratories of Cleveland, Ohio (hereinafter "NACL").

Again referring to FIG. 1, a semi-transparent mirror coating 5 is applied to the convex surface of the front lens element 2, a hydrophobic silicon or amorphous diamond-like carbon (hereinafter "DLC") coating 7 is applied over said semi-transparent mirror coatings, an antireflectant coating 8 is applied to the concave surface of the rear lens element 4, and a hydrophobic silicon dioxide coating 9 is applied over the antireflectant coating 8. A preferred method for the laminated-glass type of lens is to perform all coatings prior to lamination to permit using the highest practical annealing temperatures in the coating chamber. This method imparts the best durability to the coatings.

Alternatively, the external surfaces of the composite lens may be vacuum-coated after lamination if a process is used which maintains a low enough temperature so as not to damage the polarizer or lamination integrity. One such coating process is described in U.S. Pat. No. 4,838,673. Another method currently available from a number of coating vendors is an ion-assisted process originally developed for plastic lenses. Ion-assisted coating can use chamber temperatures low enough to be safe for laminated polarized glass and plastic lenses.

The overall transmitted tint of the finished composite lens may be rendered deliberately non-neutral if desired, by incorporating additional tint(s) appropriate to the desired result, in a manner similar to that used for neutralizing the composite tint. The trichroism exaggerates otherwise subtle auxiliary tints, making it easy to "swing" the tint in one chromatic direction or another without introducing excessive density. The scope of the invention is intended to include all such applications.

Antireflectant coatings reduce glare caused by reflections from behind the wearer, or from the wearer's face. A preferred multilayer broadband type is available from NACL, as well as from many other optical coating vendors. The hydrophobic silicon dioxide coating imparts a hydrophobic (water-repellant) and antistatic (dust-repellant) property to the surface of the lens, making the lens substantially easier to clean and to keep clean than lenses not so coated. DLC coatings provide extreme scratch resistance with hydrophobic/antistatic properties similar to silicon. Hydrophobic silicon and DLC coatings have both been known in the sunglass industry for some time, and are available from NACL as well as from many other optical coating vendors. Alternatively, the silicon coatings may be of the liquid-dip variety.

Figure 2:
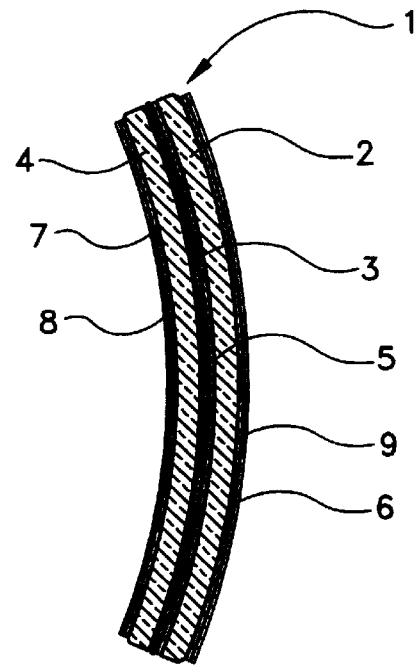
FIG. 2 is a cross-sectional view of another embodiment of a lens of the invention, depicting a polarizing film disposed between two curved lens elements, wherein the front lens element is photochromic, the rear lens element is a trichroic contrast enhancer, and coatings are applied to the concave and convex surfaces of the front lens element and to the concave surface of the rear lens element.

Referring to FIG. 2, an alternative embodiment is depicted as a composite lens body generally designated 1, having a front lens element 2 and a rear lens element 4; at least one of the lens elements being a trichroic contrast enhancer, the lens elements 2 and 4 are conjoined with and enclose a polarizing film 3, and a semi-transparent mirror coating 5 is applied to the concave surface of the front lens element for ultimate durability, antireflectant coatings 9 and 7 are applied to the convex surface of the front lens element and to the concave surface of the rear leans element respectively, and hydrophobic coatings 6 and 8 are applied over said antireflectant coatings on the front and rear lens elements, respectively. The antireflectant coating on the convex surface of the front lens element reduces reflections between the internal mirror and the lens-to-air interface.

Substitutions may be made provided that the luminous and spectral transmission properties of the specified materials are adequately duplicated. For example, the spectral transmission profile of the above-specified mirror coating could be approximated by using a brown photochromic and a slightly-greenish gray polarizer, or by using a pale green non-photochromic front lens element and a pale brown or amber polarizer, and/or by using color coatings, dyes, or other treatments. It is intended that all alternative means which cooperate with the composite lens so as to achieve apparently neutral transmitted tint in the finished lens, when viewed in daylight, be considered to be included within the scope of the invention.

The photochromic front lens element of the preferred embodiment darkens, becoming more brown in hue, thus absorbing more blue and near-UV spectra as the intensity of the sunlight and its UV and blue spectra increase, thereby compensating light level and adjusting short-wavelength absorption simultaneously. The darkening range of the photochromic element can be deliberately constrained by controlling its exposure to UV wavelengths in the range of 360 to 400 nm through UV-absorbent coatings applied to its front surface.

In one alternative embodiment, a photochromic lens element is used which has a neutral-gray tint. The polarizing film has a brown tint, while the other lens element is a trichroic contrast enhancer. The relative contribution of the brown tint to the overall color balance is maintained constant over light level changes, as the neutral-gray photochromic element darkens in bright sunlight to control light intensity without altering the color-filtering properties of the lens.

In other alternative embodiments, no photochrornic lens elements are used. Either one trichroic contrast enhancer lens element and one crown-glass (tinted or clear) lens element, or two trichroic contrast enhancer lens elements, are laminated together with a polarizing film enclosed within. The dual-enhancer embodiments produce stronger color and contrast enhancement. The transmitted tint can bed neutralized or otherwise adjusted through additional glass or polarizer tints, and/or mirror coatings as previously described. As no photochromic element is used, the transmission properties of this embodiment do not change when exposed to varying levels of sunlight.

Conventional industry methods and processes for laminated glass polarized lenses may be used, as such have been available commercially for decades. Two lens elements of matching curvature and appropriate thickness (typically around 1 mm) are ground and polished, such that when laminated together with polarizing film sandwiched within produce a composite lens with thickness and weight similar to standard non-laminated glass lenses. Corrective-prescription versions of the invention would have a trichroic contrast enhancer as the front element with a clear crown glass rear element to prevent unwanted center-to-edge density gradients as would occur in high-diopter lenses.

The process used to fabricate a laminated plastic-lens embodiment is similar to that described above for laminated glass lenses. Two plastic lens elements are joined together with polarizing film sandwiched within, to form a single lens. Alternatively, a plastic lens of the invention may be molded or cast around the polarizing film. Lastly, a molded plastic lens could have a polarizing treatment applied externally. In the first case, the lens "elements" are the two layers of plastic, one layer on each side of the polarizer. In the last case, there is only one lens element—that is, the entire molded lens body.

The trichroic filter scheme of the invention is realized in the laminated plastic version by a means analogous to the glass-lens embodiments. One or both of the plastic lens elements or layers—or the polarizing film—is coated, dyed, or otherwise treated to achieve the previously-defined trichroic spectral-transmission properties, while any other treatments employed for overall tint-neutralization are present in the same or other lens element or layer, and/or in the polarizing film, and/or in surface coatings. In a photochromic plastic lens of the invention, one of the lens elements or layers is a photochromic plastic, while the other is a trichroic contrast enhancer.

Figure 3:
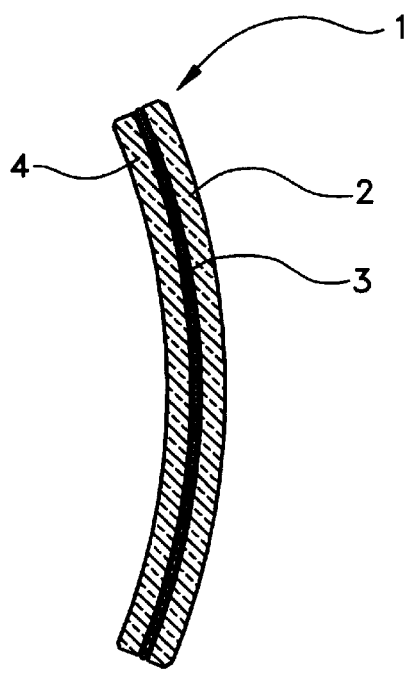
FIG. 3 is a cross-sectional view of an uncoated lens of another embodiment of the invention, depicting a polarizing film disposed between two curved lens elements, wherein at least one of said lens elements is a trichroic contrast enhancer.

An uncoated lens can also be produced within the scope of the invention. Tint-neutralization may be achieved in uncoated lenses by using appropriate tints in the front element and polarizer. One lens element of Schott S-8807 glass, a brown A polarizer, and one green A lens element makes a good neutral-gray combination. Another good combination is one lens element of Schott S-8801 glass, a brown A polarizer, and clear crown glass for the second lens element. Many other useful combinations are possible; these could include the use of a photochromic front lens element. Referring to FIG. 3, an uncoated embodiment is depicted as a composite lens body generally designated 1 having a front lens element 2 and a rear lens element 4, at least one of the lens elements being a trichroic contrast enhancer, with the lens elements cojoined with and enclosing a polarizing film 3.

Figure 4:
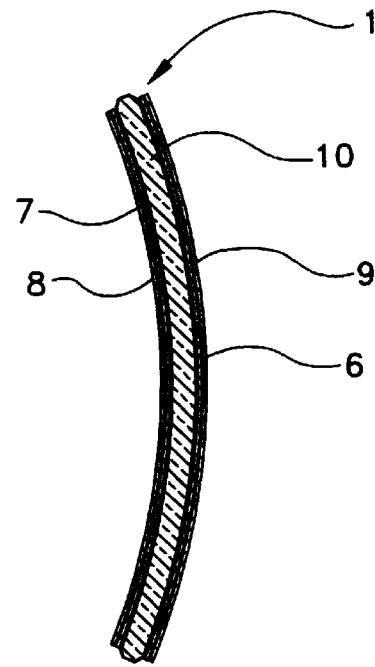
FIG. 4 is a cross-sectional view of another embodiment of a lens of the invention, depicting a curved lens body which is a trichroic contrast enhancer, and which has coatings applied to its concave and convex surfaces, at least one of said coatings being a polarizer.

As an alternative to laminated construction requiring two lens elements, the invention may be realized in an embodiment wherein the polarizer is applied to an external surface of a single lens body. Such polarizing coating may be of the type disclosed by Keum (U.S. Pat. No. 5,245,470), or it may be one of several other methods known to those skilled in the art. Referring to FIG. 4, a non-laminated lens generally designated 1 is formed of a single lens body 10 which is a trichroic contrast enhancer, having a polarizing coating or treatment 9 with a hydrophobic silicon or DLC overcoating 6 applied to its convex surface, and having an antireflectant coating 7 with a hydrophobic silicon overcoating 8 applied to its concave surface.

While the invention has been disclosed with reference to specific embodiments, it is understood that variations may be made without deviating from the essence of the invention.

What is claimed is:

1. A lens comprising a front lens element and a rear lens element, each said lens element having a convex surface on one side and concave surface on the other side thereof, at least one of said lens elements comprising a trichroic contrast enhancer, said lens elements being adhered together with a light-polarizer disposed between said lens elements, front and rear exterior surfaces of said lens being defined by said convex surface of said front lens element and said concave surface of said rear lens element, respectively, and said trichroic contrast enhancer:

a) providing maximum light transmission with respect to CIE illuminant C at three or more points (hereinafter "maxima"), at least one of said maxima being located within each of three maximum-transmission wavelength bands defined by respective spectral ranges of 610–650 nm, 480–520 nm, and 420–460 nm, each of said maxima having a light transmission value at least 125% of the integrated visible-light transmission value of said trichroic contrast enhancer, b) providing minimum light transmission with respect to CIE illuminant C at two or more points (hereinafter "minima"), at least one of said minima being within each of two minimum-transmission wavelength bands defined by spectral ranges located chromatically between the spectral ranges defining said maxima, wherein the value of the highest of said maxima in each of said maximum-transmission bands is equal to 80% to 120% of the average value of the three highest of said maxima, and wherein the lowest value of said minima in each of said minimum-transmission bands is 75% or less of the value of the integrated visible-light transmission value of said lens.

2. The lens of claim 1 wherein the front lens element is photochromic.

3. The lens of claim 1 having an antireflectant coating on at least one exterior surface of said lens.

4. The lens of claim 1 having a hydrophobic coating on at least one surface of said lens.

5. The lens of claim 1 having a semi-transparent mirror coating on said convex surface of said front lens element.

6. The lens of claim 5 having a hydrophobic coating applied over said semi-transparent mirror coating.

7. The lens of claim 1 having a semi-transparent mirror coating on said concave surface of said front lens element.

8. The lens of claim 1 having a tint-neutralizing filter in addition to said trichroic contrast enhancer, said tint-neutralizing filter cooperating with said trichroic contrast enhancer to cause the transmitted tint of said lens to appear substantially neutral-gray under sunlight.

9. The lens of claim 8 wherein said filter is selected from the group consisting of glass dopants, plastic additives, dyes, stains, heat treatments, exposure to ultraviolet light, chemical baths, semi-transparent mirror coatings, and semi-transparent color coatings.

10. A lens comprising at least one lens element and a light-polarizer, said lens having a convex exterior surface on one side thereof and a concave exterior surface on another side thereof, said lens providing the following trichroic transmission characteristics:

a) maximum light transmission with respect to CIE illuminant C at three or more points (hereinafter "maxima"), at least one of said maxima being located within each of three maximum-transmission wavelength bands defined by respective spectral ranges of 610–650 nm, 480–520 nm, and 420–460 nm, each of said maxima having a light transmission value at least 125% of the integrated visible-light transmission value of said trichroic contrast enhancer, b) minimum light transmission with respect to CIE illuminant C at two or more points (hereinafter "minima"), at least one of said minima being within each of two minimum-transmission wavelength bands defined by spectral ranges located chromatically between the spectral ranges defining said maxima, wherein the value of the highest of said maxima in each of said maximum-transmission bands is equal to 80% to 120% of the average value of the three highest of said maxima, and wherein the lowest value of said minima in each of said minimum-transmission bands is 75% or less of the value of the integrated visible-light transmission value of said lens.

11. The lens of claim 10 having an antireflectant coating on at least one exterior surface of said lens.

12. The lens of claim 10 having a hydrophobic coating on at least one said exterior surface of said lens.

13. The lens of claim 10 having a semi-transparent mirror coating on said convex surface of said lens.

14. The lens of claim 10 having a front lens element and a rear lens element, each said lens element having a convex surface on one side and concave surface on the other side thereof, said lens elements being adhered together with a light-polarizer disposed between said lens elements, front and rear exterior surfaces of said lens being defined by said convex surface of said front lens element and said concave surface of said rear lens element, respectively, and, said lens further comprising a semi-transparent mirror coating on said concave surface of said front lens element.

15. The lens of claim 10 having a spectral filter in addition to said trichroic transmission providing element, said spectral filter cooperating with said trichroic transmission providing element so as to cause the transmitted tint of said lens to appear substantially neutral-gray in daylight conditions.

16. The lens of claim 15 wherein said spectral filter is selected from the group consisting of class dopants, plastic additives, dyes, stains, heat treatments, exposure to ultraviolet light, chemical baths, semi-transparent mirror coatings, and semi-transparent color coatings.

* * * * *